United States Patent Office 3,044,975
Patented July 17, 1962

3,044,975
PROCESS FOR THE PRODUCTION OF SPINNING SOLUTIONS OF POLYACRYLONITRILE
Hanns Gerber, Buderich, near Dusseldorf, and Rudolf Stroh, Leverkusen-Bayerwerk, Germany, assignors to Farbenfabriken Bayer Aktiengesellschaft, Leverkusen, Germany, a corporation of Germany
No Drawing. Filed Oct. 23, 1957, Ser. No. 692,009
Claims priority, application Germany Jan. 17, 1957
4 Claims. (Cl. 260—32.6)

The present invention relates to a spinning solution of polyacrylonitrile.

It is known to use in the polymerisation of acrylonitrile, instead of water, organic solvents which dissolve monomeric acrylonitrile, but not polymeric acrylonitrile. It is further known to polymerise acrylonitrile in solvents which dissolve both monomeric and polymeric acrylonitrile. Solvents of this kind are chiefly ethylene carbonate, propylene carbonate and their mixtures. The high boiling point, above 250° C., of these solvents restricts the use of these polyacrylonitrile solutions practically to the wet spinning process. In practice, however, solutions are desirable for the use in both wet and dry spinning. A solvent for polyacrylonitrile which is suitable for both processes is dimethyl formamide. This solvent possesses, however, chain-stabilising properties (cf. Journal of Polymer Science, vol. 17, pages 275–290, 1955) so that the polymerisation of acrylonitrile in dimethyl formamide does not lead to polyacrylonitrile having the desired degree of polymerisation.

It is an object of the present invention to provide a process by which spinning solutions suitable for both the wet- and dry-spinning process are obtained. A further object is the provision of a process for dissolving and spinning of polyacrylonitrile in which the necessity of recovering the polyacrylonitrile in the dry state is avoided. Further objects will become apparent as the following specification proceeds.

It has now been found that these disadvantages can be overcome and that spinning solutions of polyacrylonitrile and interpolymers thereof with a preponderant proportion of acrylonitrile can be obtained by polymerisation of acrylonitrile in an organic solvent which dissolves the monomers but not the polymers, in such a manner that after the polymerisation is completed the solvent is replaced by a solvent which is suitable for dissolving polyacrylonitrile, or its interpolymers with a preponderant proportion of acrylonitrile.

The process according to the invention has the advantage, compared with the conventional process, in which the polymerisation is carried out in an aqueous phase, that the recovery of the polyacrylonitrile and its further working up, i.e. washing, drying, grinding and redissolving, becomes unnecessary.

Organic solvents, which dissolve acrylonitrile and monomeric components but do not impede the polymerisation, are low-boiling chlorinated hydrocarbons such as carbon tetrachloride or 1,2-dichloroethane.

For carrying out the process, the polymerisation is effected in these solvents using a suitable catalyst such as azoisobutyric acid dinitrile, and then adding the quantity of dimethylformamide required for dissolution of the polymer formed (or of another solvent suitable for dissolution of polyacrylonitrile) and removing the chlorinated hydrocarbon by distillation.

In this way a solution is obtained which may be used directly for the production of filaments, films, ribbons and other shaped articles.

The following example is given for the purpose of illustrating the invention.

Example

Into a reaction vessel fitted with two feed vessels, reflux condenser and stainless steel stirrer there are run the two solutions A and B simultaneously at 70° C. within 4 hours.

Solution A:
   142 parts by weight of acrylonitrile
   8 parts by weight of methyl acrylate
   550 parts by weight of carbon tetrachloride
Solution B:
   0.2 part by weight of azoisobutyric acid nitrile
   550 parts by weight of carbon tetrachloride When the polymerisation is completed the temperature is maintained for three hours and the mixture is further stirred. 650 parts by weight of dimethyl formamide are subsequently added thereto and the carbon tetrachloride is distilled off in a vacuum of 80–100 mm. Hg.

The yield in the polymer is 94.3 percent, $k$ value 104. The solution thus obtained may be spun into fibres of usual textile quality by both the wet and dry spinning process.

We claim:
1. In a process for the spinning of shaped articles from an acrylonitrile polymer, the improvement which consists of combining the polymerization and the spinning operation into a continuous process without the necessity of separating the polymer between these two steps, said process comprising the steps of polymerizing in a low boiling chlorinated hydrocarbon solvent a member selected from the group consisting of acrylonitrile and an acrylonitrile-methyl acrylate mixture, the latter containing about 4–8% of methyl acrylate and about 92–98% acrylonitrile, the resulting polymer being insoluble in said low boiling chlorinated hydrocarbon, adding dimethyl formamide to the mixture of polymer and chlorinated hydrocarbon so as to completely dissolve the polymer therein, distilling the chlorinated hydrocarbon from the resulting mixture, and then spinning the resulting solution directly into a shaped article.

2. Process of claim 1 wherein the polymer is polyacrylonitrile.

3. Process of claim 1 wherein the polymer is spun into filaments.

4. In a process for the spinning of filaments from an acrylonitrile polymer, the improvement which consists of combining the polymerization and the spinning operation into a continuous process without the necessity of separating the polymer between these two steps, said process comprising the steps of polymerizing about 92–96% acrylonitrile with from about 4–8% of methyl acrylate in carbon tetrachloride, the resulting polymer being insoluble therein, adding dimethyl formamide to the mixture of polymer in carbon tetrachloride in an amount sufficient to completely dissolve the latter, distilling the chlorinated hydrocarbon solvent from the mixture, and then spinning the resulting polymer solution directly into filaments.

References Cited in the file of this patent
UNITED STATES PATENTS

| | | |
|---|---|---|
| 2,426,719 | Watkins | Sept. 2, 1947 |
| 2,471,742 | Harrison | May 31, 1949 |
| 2,482,056 | Elwell et al. | Sept. 13, 1949 |
| 2,529,911 | Caldwell | Nov. 14, 1950 |
| 2,648,647 | Stanton | Aug. 11, 1953 |
| 2,763,636 | Davis | Sept. 18, 1956 |